Dec. 15, 1936.  H. S. OGDEN  2,064,626
CONTROLLER
Filed Jan. 2, 1936  2 Sheets—Sheet 2
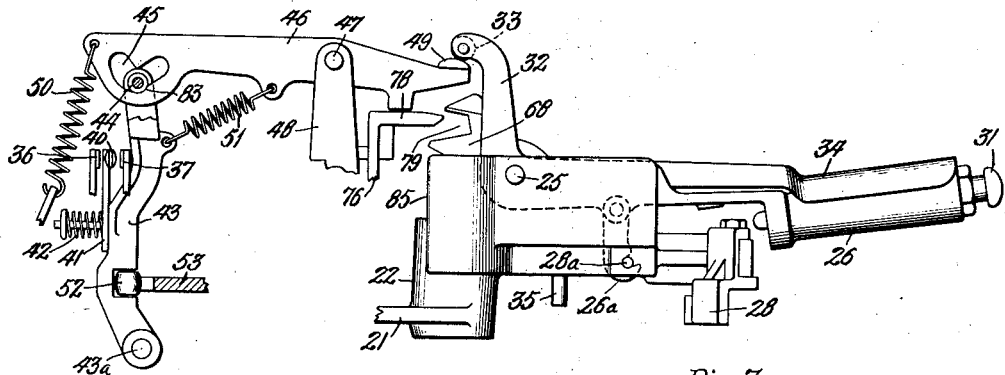
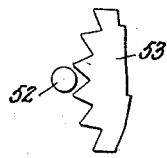
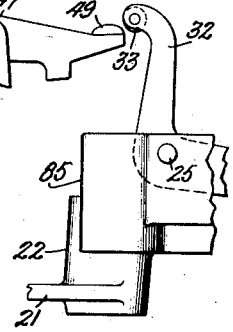
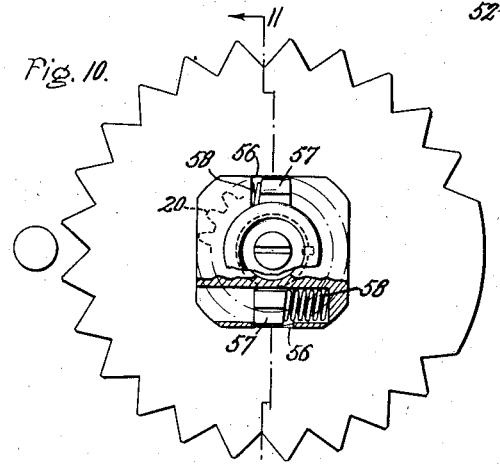
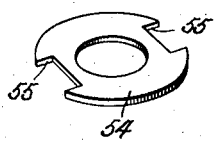
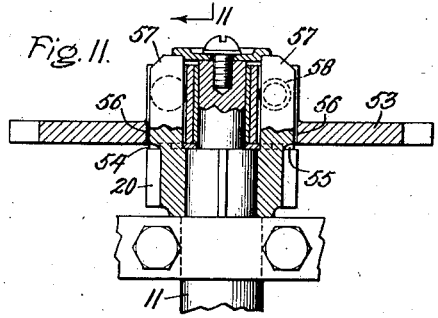
Inventor:
Harold S. Ogden,
by Harry E. Dunham
His Attorney.

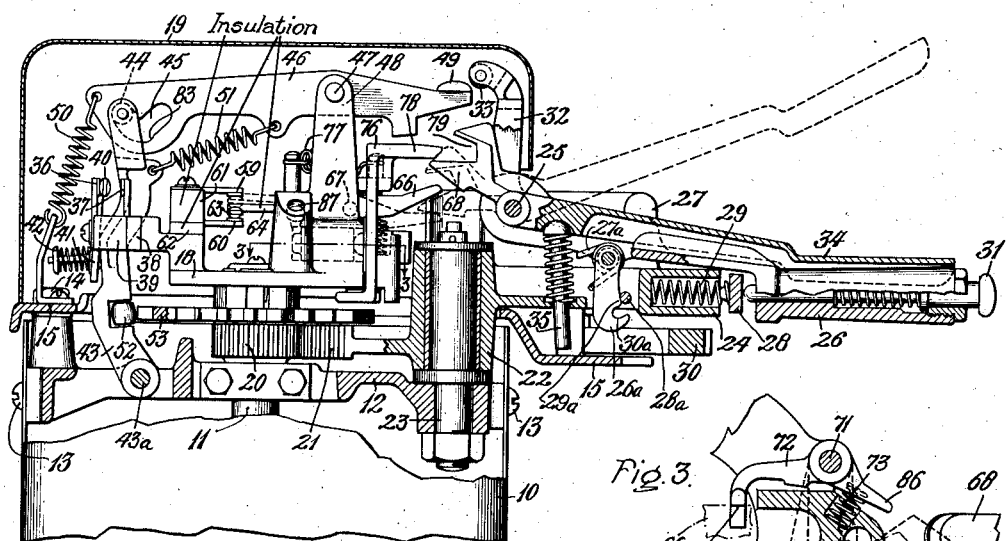

Patented Dec. 15, 1936

2,064,626

UNITED STATES PATENT OFFICE 2,064,626

CONTROLLER

Harold S. Ogden, Erie, Pa., assignor to General Electric Company, a corporation of New York Application January 2, 1936, Serial No. 57,094

12 Claims. (Cl. 200—7)

My invention relates to electric circuit controllers, more particularly to controllers for providing a large number of control steps with a minimum number of switch members, such as used in the control of electric railway motors, and has for an object the provision of a controller of this character which is simple and reliable in its operation.

In a copending application of John F. Tritle, Serial No. 38,573, filed August 30, 1935, entitled "Control system and apparatus", which application is assigned to the same assignee as the present invention, there is disclosed a variable voltage control system for electric locomotives of the type in which an auxiliary transformer is provided for selectively applying a bucking or a boosting component of voltage to the voltage supplied from the main power transformer to the electric driving motors. The said Tritle application further discloses a controller which is notchable to a plurality of positions to vary in predetermined steps the voltage supplied to the motors from the main transformer, and which is provided with an auxiliary handle operable at each notch of the controller to operate suitable auxiliary control means for varying the energization of the auxiliary transformer whereby the voltage applied to the motors is varied in predetermined small steps. Controllers adapted to accomplish the above sequence of control may be generally designated as "interpoint notching" controllers, since an additional notching control is accomplished intermediate the main notching points of the controller.

While my invention is particularly applicable to control systems for electric locomotives of the type disclosed in the above Tritle application, it is not limited thereto but is generally applicable to systems in which it is desired to provide a plurality of control steps intermediate the main notches of the controller.

Although controllers of the type disclosed in the above Tritle application are operable to carry out the desired sequence of control steps in an entirely satisfactory manner, some objection has been found to the use of an auxiliary handle. This objection is due, in part, to the fact that it is inconvenient for the operator to remove his hand from the main handle of the controller at each notch for the purpose of operating the auxiliary handle. Particularly is this true when the controller is equipped with emergency control means of the type commonly known as a "dead-man's-release", applied to the main handle grip and biased for operation to the emergency position when the operator removes his hand from the main handle. Furthermore, the sequence of operation required of the operator in manipulating both a main handle and an auxiliary handle may confuse the operator. Accordingly, it is a further object of my invention to provide a controller of the "interpoint notching" type which is provided with a single control handle.

In carrying out my invention in one form, I provide a controller comprising an operating handle which is notchable to a plurality of positions in a predetermined plane to operate main control means and which is operable in a different plane independently of the main control means to operate suitable auxiliary control means. More specifically, the operating handle is pivotally mounted on an operating member to drive the operating member when moved in a predetermined plane, the operating member being arranged to drive the main control means, while the auxiliary control means are arranged for operation in response to movement of the handle about its pivot at any position of the operating member. The auxiliary control means comprises a switch member normally maintained in an initial position against its bias and latch means movable in response to movement of the handle about its pivot to provide for sequential movement of the switch member to a plurality of other positions. Means are also provided for returning the switch member to its initial position in response to movement of the operating member when the handle is moved in its predetermined plane.

For a more complete understanding of my invention, reference should now be had to the drawings, in which Fig. 1 is a fragmentary, elevational view, partly in section, of a controller embodying my invention; Fig. 2 is a plan view of the controller shown in Fig. 1, with the cover removed more clearly to illustrate the details of construction; Fig. 3 is a fragmentary, cross-sectional view taken along the line 3—3 of Fig. 1; Fig. 4 is a perspective view showing the detailed construction of one of the operating elements of the controller shown in Fig. 1; Fig. 5 is a fragmentary, perspective view of a portion of the emergency control means of the controller shown in Fig. 1; Figs. 6 and 7 are fragmentary, elevational views showing certain parts of the auxiliary control means in different operating positions; Figs. 8 and 9 are partial plan views showing the relative positions of certain of the parts when the auxiliary control means is in the positions shown in Figs. 6 and 7, respectively; Fig. 10 is a partial plan view showing the details of construction of a portion of the reset mechanism; Fig. 11 is a cross-sectional view taken along the line 11—11 of Fig. 10; and Fig. 12 is a perspective view showing the details of construction of one of the parts shown in cross-section in Fig. 11.

Referring now to the drawings, I have shown my invention as applied to a controller for electric railway motors comprising a casing 10 within which is mounted the main control means which includes an operating shaft 11, the upper end of which is journaled in the upper end frame 12 of the controller, the end frame 12 being secured to the walls of the casing 10 by suitable screws 13. Mounted on the end frame 12 and secured thereto by suitable bolts 14, is an end cap 15 which is provided with a central aperture 16. Extending inwardly from the opposite sides of the aperture 16, is a pair of fingers 17 arranged to support an annular base member 18 on which the auxiliary control means is mounted, a suitable cover 19 being provided which rests on the end cap 15, as shown in Fig. 1.

Keyed to the upper end of the shaft 11, is a pinion 20 arranged to be engaged by a segmental gear 21 which comprises one arm of an operating member 22, the hub portion of which is journaled on a stub shaft 23 mounted on the end frame 12, the other arm 24 of the operating member 22 extending outwardly on the opposite side of the hub from the segmental gear 21. As shown, the arm 24 of the operating member 22 is substantially U-shaped in cross-section, and a pin 25 extending between the upstanding legs of the U serves pivotally to support one end of an operating handle 26, an intermediate portion of which is engaged by inwardly extending fingers 27 formed on the upstanding legs of the U-shaped arm 24.

Pivotally mounted on the outermost end of the arm 24, is a pawl 28 which is normally biased by the spring 29 to the position shown in Fig. 2, in which position one end of the pawl engages a dial ring 30 which is supported at its opposite ends on the end cap 15. As shown best in Fig. 1, the operating handle 26 is provided with a spring biased push button 31, the inner end of which is arranged to engage the pawl 28 so that when the push button 31 is depressed, the pawl is rotated in a counterclockwise direction about its pivot, as viewed in Fig. 2, out of engagement with the dial ring 30. It will thus be seen that the pivot pin 25 and the shoulders 27 on the arm 24 form a rigid driving connection between the operating handle 26 and the operating member 22, so that when the push button 31 is depressed and the handle 26 is moved in a horizontal plane, the operating member 22 will be rotated about the shaft 23 and the main control means will be operated through the shaft 11.

It will also be apparent that the handle 26 is movable about the pivot pin 25 in a substantially vertical plane independently of the operating member 22, and the pivoted end of the operating handle 26 is provided with a bifurcated extending finger 32, the upper end of which carries a roller 33 for operating the auxiliary control means in response to movement of the handle about its pivot.

In order to limit positively the movement of the handle 26 in a vertical plane, I provide a spring pressed pawl 26a which is pivoted on the handle 26, as shown, and biased by a spring 27a into engagement with a pin 28a on the arm 24. As shown, the pawl 26a is provided with a cam portion 29a which co-operates with the pin 28a to provide a notching action during vertical movement of the handle 26, and with a hooked end 30a which positively limits upward movement of the handle 26.

Also pivoted on the pin 25 is an emergency release handle 34 which closely overlies the handle 26, as shown, and is normally biased by a spring pressed plunger 35 to the position indicated by the dotted line in Fig. 1. The arrangement and the operation of the emergency control handle 34 and the control means responsive to movement thereof will be more fully described hereinafter.

The auxiliary control means which is responsive to movement of the handle 26 in a vertical plane is mounted on the supporting member 18, and comprises a pair of fixed contacts 36 mounted in spaced relation with a second pair of fixed contacts 37 by means of insulating blocks 38 and 39 secured to the base member 18. Arranged for selective movement into and out of engagement with the fixed contacts 36 and 37, is a bridging member 40 which is carried by an insulating member 41 resiliently supported by a spring 42 on a pivoted switch member 43.

As shown, one end of the switch member 43 is pivotally mounted on a pin 43a supported by the end frame 12, and the other end of the switch member 43 is bifurcated to support a roller 44 which co-operates with a substantially V-shaped slot 45 in a pivoted latching member 46. This latching member 46 is pivoted intermediate its ends on a pin 47 supported between a pair of spaced apart fingers 48 which extend upwardly from the support member 18, and the end of the latch member opposite from the V-shaped slot is provided with a bearing member 49 arranged to be engaged by the roller 33. As shown, the latch member 46 is normally biased to the position shown in Fig. 1 by a spring 50, so as to retain the switch member 43 in the initial position shown in Fig. 1 against the bias of a spring 51, the opposite ends of which are respectively connected to the switch member 43 and the latch member 46. It will be apparent that when the latch member 46 is rotated in a clockwise direction about its pivot from the position shown in Fig. 1, the roller 44 will move along one side of the V-shaped slot 45, and accordingly, the switch member 43 will move in a clockwise direction about its pivot in accordance with the bias exerted by the spring 51 to the position shown in Fig. 6. Likewise, it will be apparent that if the latch member 46 is now rotated in a counterclockwise direction about its pivot, the roller 44 will move along the other side of the V-shaped slot and the switch member 43 will rotate in a clockwise direction about its pivot to the position shown in Fig. 7.

In order to return the switch member 43 to the initial position shown in Fig. 1 against the bias of the spring 51, I provide reset means comprising a roller 52 which is carried by an intermediate portion of the switch member 43 and arranged to co-operate with a starwheel 53 journaled on the upper end of the shaft 11. As shown best in Figs. 10 and 11, this starwheel 53 is supported on a washer 54 which rests against the upper surface of the pinion 20. This washer 54 is provided with suitable notches 55 (Fig. 12), and the hub of the starwheel 53 is provided with suitable apertures 56 through which extend a pair of fingers 57 formed integrally with the pinion 20. As shown in Fig. 10, these fingers 57 are somewhat smaller in cross-section than the apertures 56, and accordingly, form a lost-motion driving connection between the pinion 20 and the starwheel 53, suitable springs 58 being provided for normally biasing the fingers 57 into engagement with one side of the apertures 56.

The emergency control means which is responsive to movement of the emergency handle 34 comprises a pair of spaced apart fixed contacts 59 (Figs. 1 and 2) supported in spaced relation with a second pair of fixed contacts 60, the two pairs of contacts being supported on suitable insulating blocks 61 and 62 secured to the base member 18. Arranged selectively to engage the contacts 59 and 60, is a bridging member 63 supported on an insulating bar 64 which is resiliently mounted by means of a spring 65 (Fig. 5) on a pivoted operating member 66. As shown, this operating member 66 is pivotally mounted on a pin 67 supported between the arms 48, and the extending end of the operating member 66 opposite from the bridging member 63 is arranged adjacent a finger 68 which is formed integrally with and extends outwardly from the emergency handle 34.

A spring 69 arranged with one end engaging the operating member 66 and the other end engaging a pocket 70 formed in the base member 18 serves to bias the operating member 66 and the bridging member 63 to the heavy line position shown in Fig. 1, in which position the bridging member 63 engages the lower pair of contacts 60. Pivotally mounted on a pin 71 adjacent the operating member 66, is a latch member 72 which is normally biased by a spring 73 for operation about its pivot from the position shown in Fig. 2 and Fig. 3 to the latching position shown in Fig. 5. It will be apparent that when the operating member 66 is in its normal position with the bridging member 63 engaging the contacts 60, the latch member will be restrained from operation to its latching position by engagement of a shoulder 74 (Fig. 5) formed on the operating member 66 with a shoulder 75 formed on the latch member 72. However, as soon as the operating member 66 is moved about its pivot to the dotted line position shown in Fig. 1, which position is shown best in Fig. 5, the latch member 72 will be operated by its spring 73 to the latching position shown in Fig. 5.

Also pivotally supported on the pin 71 is a lockout member 76 (Fig. 4) which is normally biased by a spring 77 to the position shown in Fig. 2. This lockout member 76 is provided with an extending finger 78 which is arranged for movement into a notch 79 (Fig. 1) formed in the finger 68 extending from the emergency handle 34 upon operation of the lockout member 76 about its pivot. Such an operation of the lockout member 76 is accomplished, in a manner to be more fully described hereinafter, by a fluid operated piston 80 (Fig. 3) which is arranged in a cylindrical bore 81 formed in the base member 18, one end of the piston being arranged to engage a bearing member 82 carried by the lockout member 76.

It is now believed that a complete understanding of my invention may be had from a description of the operation of the controller when applied to a control system in which it is desirable to provide a plurality of main control steps, together with a plurality of additional control steps intermediate the main steps. It will be understood that the main control means may comprise any suitable type of controller well known in the art such, for example, as a drum controller having a plurality of conducting segments arranged sequentially to engage a plurality of co-operating switch members, and it will be apparent that as the handle 26 is moved in a horizontal plane, as viewed in Fig. 1, i. e., in a clockwise direction from the off position indicated by the broken line in Fig. 2, the operating member 22 will be rotated about the shaft 23 whereby the segment 21 will drive the pinion 20 in a counterclockwise direction so as to move the shaft 11 of the main control means. During this movement of the handle 26 it will be understood that the pawl 28 co-operates with the dial ring 30 to provide a notching movement, and it will likewise be apparent that at each notch or position of the handle, the auxiliary control means may be operated by moving the handle 26 about its pivot 25 in a vertical plane.

In the drawings, the handle 26 is shown in its eleventh notch or position, and it will be assumed that it is desired to provide a plurality of intermediate control steps before operating the handle to its next adjacent notch. These intermediate control steps may be accomplished by first moving the handle 26 about its pivot 25 from the position shown in Fig. 1 to the position shown in Fig. 6, during which movement the roller 33 carried by the arm 32 engages the bearing member 49 so as to rotate the latch member 46 about its pivot in a clockwise direction. It will be seen that as the latch member moves from the position shown in Fig. 1 to the position shown in Fig. 6, the force exerted by spring 51 and the cam action between the roller 44 and the slot 45 co-operate to move the switch member 43 in a clockwise direction about its pivot, the roller 44 moving along the slot 45 into engagement with a shoulder 83 formed adjacent the lowermost point of the V-shaped slot. Accordingly, it will be seen that the bridging member 40 is moved out of engagement with the contacts 36 to a position intermediate the contacts 37 and 38.

As shown in Fig. 6, the roller 44 engages the bottom of the slot 45 during its movement so as positively to limit the movement of the latch 46 in a counterclockwise direction and movement of the handle 26 in a vertical direction. In order to prevent an excessive stress being exerted on the auxiliary control means in case the operator attempts to lift the handle further, however, the hooked end 30a of the pawl 26a is arranged to engage the pin 28a at substantially the same instant that the roller 44 engages the bottom of the slot 45, thus providing an additional stop for limiting the movement of the handle 26.

A further intermediate control step may now be accomplished by returning the handle 26 from the position shown in Fig. 6 to its normal position shown in Fig. 1. As shown best in Fig. 7, during this movement of the handle 26, the roller 33 moves out of engagement with the bearing member 49, and accordingly, the latch member 46 is released for movement in a counterclockwise direction about its pivot in accordance with the bias exerted by the spring 50. As the latch member 46 moves in this direction, it will be seen that the spring 51 moves the switch member 43 in a right-hand direction, the roller 44 moving along the other side of the slot 45 to the position shown in Fig. 7. In this position of the switch member, the bridging member 40 engages the fixed contacts 37.

The next control step may now be accomplished by moving the handle 26 in a horizontal plane to its next notch or position to operate the main control means and to reset the auxiliary control means. As shown best in Figs. 6 to 9, the above described operation of the switch member 43 moves the roller 52 carried thereby into one of the spaces between adjacent teeth of the starwheel 53, the final position being shown best in Fig. 9. Accordingly, it will be seen that as the starwheel is rotated by movement of the handle 26 in a horizontal plane, the roller 52 will be forced outwardly from the starwheel, and accordingly, the switch member 43 will be rotated in a counterclockwise direction about its pivot. During the initial portion of this movement it will be seen that the roller 44 engages one side of the slot 45 and exerts a cam action thereon which moves the latch member 46 in a clockwise direction from the position shown in Fig. 7 against the force exerted by the spring 50. As soon as the roller passes over the crest formed by the upper sides of the V-shaped slot, the spring 50 will move the latch member 46 in a counterclockwise direction and assist the starwheel in moving the switch member 43 to the initial position shown in Fig. 1. Accordingly, the final resetting movement of the switch member 43 is accomplished with a snap action.

I have found that if the starwheel 53 is rigidly secured to the pinion 20, the resistance to movement of the starwheel which is caused by the engagement of the roller 52 with the starwheel teeth, is such as to cause a hard spot in the operation of the controller. Accordingly, the above described resilient lost-motion connection between the starwheel 53 and the pinion 20 is provided. As the pinion 20 begins to rotate in a counterclockwise direction, as viewed in Fig. 10, it will be seen that the springs 58 will be compressed so as to exert a gradually increasing force tending to rotate the starwheel. The strength of the springs 58 and the dimensions of the fingers 57 and the slots 56 are so proportioned that the fingers 57 engage the sides of the slots 56 in driving relation therewith at substantially the instant that the force exerted by the springs 58 becomes equal to the resistance offered by the roller 52. The relative positions of the roller 52 and the starwheel 53 when the switch member 43 is in its reset position are shown best in Fig. 10.

It will now be apparent that further intermediate control steps may be accomplished by again moving the handle 26 in its vertical plane before the handle 26 is moved to its next main control notch or position. It will also be seen that when the auxiliary control means is in its final position, shown in Fig. 7, the handle 26 may be moved in its vertical plane to operate the switch member 43 to the intermediate position shown in Fig. 6. During such movement of the handle 26, however, the switch member 43 is moved against the force exerted by the spring 51, and it will be remembered that during initial movement of the switch member from the initial position shown in Fig. 1 to the intermediate position, the spring 51 assists the movement of the switch member 43. Accordingly, it will be apparent that a considerably greater force on the handle 26 will be necessary to move the switch member 43 from its final position to its intermediate position than is necessary to move the switch member from its initial position to its intermediate position, and the operator is thus enabled to determine from the feel of the handle the exact position of the auxiliary control means. The handle 26 may of course be returned to its off position at any time, regardless of whether it is in its uppermost or lowermost position, the starwheel 53 and the roller 52 cooperating to reset the auxiliary control means in the manner described above if movement to the off position is initiated when the handle is in its uppermost position.

When my improved controller is applied to a control system of the type disclosed in the above referred to Tritle application, it will be apparent that the main control means is arranged to vary in predetermined steps the voltage supplied by the main power transformer, and the auxiliary control means is arranged to vary the energization of the auxiliary transformer. Thus when the bridging member 40 engages the fixed contacts 36, the auxiliary transformer is energized in bucking relation to the main power transformer, when the bridging member is in the intermediate position shown in Fig. 6, the auxiliary transformer is de-energized and when the bridging member 40 engages the fixed contacts 37, the auxiliary transformer is energized in boosting relation to the main power transformer.

The emergency control means described above is of the type well known in the art, and it will be understood that when the controller is applied to a traction system, the contacts 60 are arranged to control the main power supply circuit, while the contacts 59 are arranged to control the braking circuit. The emergency handle 34 normally occupies the position indicated by the broken lines in Fig. 1 and when it is desired to operate the controller, the emergency handle must first be depressed to the heavy line position shown in Fig. 1. With the emergency handle in this position, it will be understood that the bridging member 63 will engage the contact 60 to provide for energization of the main power circuits. If at any time during the operation of the controller, the operator moves his hand from the handle 26, the emergency handle will immediately be operated by the spring pressed plunger 35 to the emergency position shown, and consequently, the finger 68 will engage the extending end of the operating member 66, whereupon the operating member 66 will be rotated about its pivot 67 to move the bridging member 63 to the position shown in Fig. 5, thereby opening the main power circuits and completing a circuit through the contacts 59, which will cause the brakes to be applied. As soon as the operating member 66 moves to the position shown in Fig. 5, the latch member 72 will be operated to the latching position there shown by the spring 73, and accordingly, the power circuits controlled by the controller will remain de-energized. The latch member 72 may be operated to release the member 66 by returning the operating handle 26 to its off position. As shown in Fig. 2, the operating member 22 is provided with a shoulder 85 arranged to engage an extending finger 86 on the latch member 72 when the operating handle is in its off position.

The operation of the lockout member 76 to prevent operation of the emergency control means even though the operator removes his hand from the handle 26 will also be understood by those skilled in the art. In accordance with the usual practice, the cylinder 81 within which the operating piston 80 is located, is provided at one end with a connecting conduit 87 (Figs. 1 and 2)

formed in the base 18 which conduit is adapted to be connected through suitable fluid control means (not shown) to a source of fluid pressure. In case the operator desires to remove his hand from the handle 26, it is only necessary for him to operate this fluid control means so as to supply fluid under pressure to the cylinder 81. As shown best in Fig. 3, the consequent movement of the piston 80 in the cylinder 81 will be effective to move the lockout finger from the normal position to the position indicated by the heavy broken line 78. It will be apparent that in this position, the finger 78 will project into the notch 79, and accordingly, operation of the emergency control means will be prevented.

It will of course be apparent that the finger 68 on the emergency control handle 34 is so related to the operating member 66 of the emergency control means that movement of the handle 26 to its uppermost position shown in Fig. 6 will not be effective to operate the emergency control means to its emergency position, and as shown best in Fig. 6, the notch 79 in the emergency handle 34 is of sufficient size to permit the finger 78 to be moved into locking relation therewith even though the handle 26 is in its uppermost position.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A controller comprising a main control member, an operating handle, means mounting said handle for movement in a predetermined plane to a plurality of selected positions, means responsive to movement of said handle to said selected positions for operating said main control member, said mounting means also providing for movement of said handle in another plane, auxiliary control means, means responsive to movement of said handle in said other plane at any of said selected positions for operating said auxiliary control means from an initial position to another position, and means responsive to movement of said handle in said predetermined plane for returning said auxiliary control means to said initial position.

2. A controller comprising main control means, auxiliary control means, an operating handle, means mounting said handle for movement to a plurality of selected positions in a predetermined plane, means responsive to movement of said handle in said plane for operating said main control means to a plurality of selected positions, said mounting means providing for movement of said handle in another plane at any one of said selected positions independently of said main control means, means responsive to movement of said handle in said other plane at any of said selected positions for selectively operating said auxiliary control means from an initial position to a plurality of other positions, and means responsive to movement of said handle in said predetermined plane for returning said auxiliary control means to said initial position.

3. A controller comprising main control means, an operating member movable sequentially to a plurality of positions to operate said main control means, an operating handle for moving said operating member to said positions, means pivotally mounting said handle on said operating member whereby movement of said handle in one plane drives said operating member and movement of said handle in another plane is independent of said operating member, auxiliary control means, means responsive to movement of said handle in said other plane at any position of said operating member for selectively operating said auxiliary control means from an initial position to a plurality of other positions, and means responsive to movement of said operating member between said selected positions for returning said auxiliary control means to said initial position.

4. A controller comprising an operating member movable sequentially to a plurality of selected positions, an operating handle for moving said operating member, means pivotally mounting said handle on said operating member for movement in a plane substantially at right angles to the plane of movement of said operating member at any selected position of said operating member, main control means operable to a plurality of positions by movement of said operating member to said selected positions, auxiliary control means, means responsive to movement of said handle about its pivot from one position to a second position for operating said auxiliary control means from an initial position to an intermediate position, means responsive to return movement of said handle to said one position for operating said auxiliary control means from an intermediate position to a third position, and means responsive to movement of said operating member to its next adjacent position to operate said main control means for returning said auxiliary control means to said initial position.

5. A controller comprising main control means, an operating handle, means mounting said handle for movement in a predetermined plane to a plurality of selected positions, means responsive to movement of said handle to said selected positions for operating said main control means, said mounting means also providing for movement of said handle in another plane, auxiliary control means including a switch member biased for movement from an initial position to another position, latch means normally retaining said switch member in said initial position, means responsive to movement of said handle in said other plane at any of said selected positions for releasing said latch, whereupon said switch member moves to said other position, and means responsive to movement of said handle between said selected positions in said predetermined plane for returning said switch member to said initial position.

6. A controller comprising main control means, an operating member movable to a plurality of selected positions for operating said main control means, an operating handle, means mounting said handle on said operating member whereby movement of said handle in a predetermined plane drives said operating member, said mounting means providing for pivotal movement of said handle in another plane independently of said operating member, auxiliary control means including a switch member biased for movement from an initial position to another position, latch means normally retaining said switch member in said initial position, means responsive to pivotal movement of said handle in said other plane for releasing said latch, whereupon said switch member moves to said other position, and means responsive to movement of said operating member between said selected positions for returning said switch member to said initial position.

7. A controller comprising main control means, an operating member movable to a plurality of selected positions for operating said main control means, an operating handle, means mounting said handle on said operating member whereby movement of said handle in a predetermined plane drives said operating member, said mounting means providing for pivotal movement of said handle in another plane independently of said operating member, auxiliary control means including a switch member biased for movement from an initial position, a roller carried by said switch member, a latch member provided with a substantially V-shaped slot arranged to cooperate with said roller normally to retain said switch member in said initial position, said roller normally engaging one end of said slot, means responsive to pivotal movement of said handle in said other plane from one position to a second position for operating said latch member to provide for movement of said roller along one side of said V-shaped slot whereby said switch member moves from said initial position to an intermediate position, means responsive to return movement of said handle to said one position for operating said latch member to provide for movement of said roller along the other side of said V-shaped slot whereby said switch member moves to a third position, and means responsive to movement of said operating member between said selected positions for returning said switch member and said latch member to their respective initial positions.

8. In combination, a latch member provided with a substantially V-shaped slot, a switch member biased for movement from an initial position and provided with a portion extending into one end of said slot, whereby said switch member is held in said initial position against said bias, means for moving said latch member in one direction, said slot and said biasing means co-operating to move said switch member to an intermediate position in which said portion engages said V-shaped slot adjacent the apex thereof, means for moving said latch member in an opposite direction, said slot and said biasing means co-operating to move said switch member to a third position in which said portion engages the other end of said slot, and reset means for returning said switch member to said initial position against its bias, said portion during said movement co-operating with said slot to move said latch member, whereby said switch member is again held in said initial position.

9. In combination, a latch member provided with a substantially V-shaped slot, a switch member biased for movement from an initial position, a roller carried by said switch member for co-operation with said slot, means for biasing said latch member to one position wherein said roller is held in one end of said slot to latch said switch member in said initial position, means for moving said latch member to a second position to move said roller along said V-shaped slot toward the apex thereof, whereby said switch member is moved to an intermediate position in accordance with its bias, means including said biasing means for moving said latch member from said second position toward said first position to move said roller along said slot toward the other end thereof, whereby said switch member is moved to a third position in accordance with its bias, and reset means for returning said switch member to said initial position and said latch member to said one position.

10. A controller comprising a main control member, an operating handle, means mounting said handle for movement in a predetermined plane to a plurality of selected positions, means responsive to movement of said handle to said selected positions for operating said main control member, said mounting means also providing for movement of said handle in another plane, means for limiting the movement of said handle in said other plane, auxiliary control means responsive to said limited movement of said handle at any of said selected positions, an emergency handle mounted for movement with said operating handle in said other plane, said handles having adjacent grip portions arranged to be simultaneously gripped, means biasing said emergency handle for further movement in said other plane independently of said operating handle upon release of said grip portions, and emergency control means responsive to said further movement of said emergency handle, said emergency control means being unaffected by said limited movement of said handles.

11. A controller comprising a main control member, an operating handle, means mounting said handle for movement in a predetermined plane to a plurality of selected positions, means responsive to movement of said handle to said selected positions for operating said main control member, said mounting means also providing for movement of said handle in another plane, means for limiting the movement of said handle in said other plane, auxiliary control means responsive to said limited movement of said handle at any one of said selected positions, an emergency handle mounted for movement with said operating handle in said other plane, said handles having adjacent grip portions arranged to be gripped simultaneously, means biasing said emergency handle for further movement in said other plane independently of said operating handle upon release of said grip portions, emergency control means responsive to said further movement of said emergency handle, and locking means operable to prevent said further movement of said emergency control means even though said grip portions are released, said locking means being effective at any position of said operating handle.

12. In a controller having main control means operable between a plurality of selected positions and auxiliary control means operable from an initial position to a second position at any of said selected positions, the combination of reset means for returning said auxiliary control means to said initial position comprising a starwheel, a member engageable with the teeth of said starwheel upon operation of said auxiliary control means to said second position, and means for exerting a gradually increasing force on said starwheel to cause said teeth to move said member in a direction to return said auxiliary control means to said initial position as said main control means is operated to its next adjacent position comprising a lost motion driving connection between said main control means and said starwheel and resilient means engaging said starwheel and arranged to be increasingly stressed during the lost motion movement of said driving connection.

HAROLD S. OGDEN.